(12) United States Patent
Bangel et al.

(10) Patent No.: US 7,885,927 B2
(45) Date of Patent: *Feb. 8, 2011

(54) TRANSFER OF TABLE INSTANCES BETWEEN DATABASES

(75) Inventors: Matthew J. Bangel, Poughkeepsie, NY (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 378 days.

This patent is subject to a terminal disclaimer.

(21) Appl. No.: 12/175,832

(22) Filed: Jul. 18, 2008

(65) Prior Publication Data

US 2008/0275927 A1 Nov. 6, 2008

Related U.S. Application Data

(63) Continuation of application No. 11/047,191, filed on Jan. 31, 2005, now Pat. No. 7,430,558.

(51) Int. Cl.
G06F 17/30 (2006.01)

(52) U.S. Cl. .................. 707/634; 707/809; 707/655

(58) Field of Classification Search ............... 707/635, 707/634, 626, 809, 610, 620, 655
See application file for complete search history.

(56) References Cited

U.S. PATENT DOCUMENTS

| | | | |
|---|---|---|---|
| 5,617,565 A | 4/1997 | Augenbraun et al. | |
| 5,966,135 A | 10/1999 | Roy et al. | |
| 6,266,673 B1 * | 7/2001 | Hong et al. | 1/1 |
| 6,289,357 B1 * | 9/2001 | Parker | 707/610 |
| 6,356,901 B1 * | 3/2002 | MacLeod et al. | 1/1 |
| 6,473,765 B1 * | 10/2002 | Fink | 707/702 |
| 6,496,850 B1 | 12/2002 | Bowman-Amuah | |
| 6,542,899 B1 | 4/2003 | Saulpaugh et al. | |

(Continued)

FOREIGN PATENT DOCUMENTS

WO WO 97/46954 12/1997

OTHER PUBLICATIONS

Xiaotao et al, The Case for Semantic Aware Remote Replication, Oct. 30, 2006, pp. 1-6.*

(Continued)

*Primary Examiner*—John R. Cottingham
*Assistant Examiner*—Sherief Badawi
(74) *Attorney, Agent, or Firm*—Schmeiser, Olsen & Watts; William E. Schiesser (57) ABSTRACT

A system and computer program product for transferring N table instances $X_1, X_2, \ldots, X_N$ of a table T from a source database S to destination databases $D_1, D_2, \ldots, D_N$, respectively. The method is implemented by executing a computer code by a processor of a computer system. N is at least 1. For $I=1, 2, \ldots, N$ the method includes: determining whether the table T has been defined for destination database $D_I$, and if it is determined that the table T has not been defined for the destination database $D_I$ then defining the table T for the destination database $D_I$; and transferring the instance $X_I$ of the N table instances from the source database S into the defined table T of the destination database $D_I$.

4 Claims, 7 Drawing Sheets

U.S. PATENT DOCUMENTS

| | | | |
|---|---|---|---|
| 6,640,244 B1 | 10/2003 | Bowman-Amuah | |
| 6,895,417 B2 * | 5/2005 | Obara et al. | 1/1 |
| 6,983,295 B1 * | 1/2006 | Hart | 707/610 |
| 7,149,746 B2 * | 12/2006 | Fagin et al. | 707/756 |
| 7,716,181 B2 * | 5/2010 | Todd | 707/635 |
| 7,734,580 B2 * | 6/2010 | Lahiri et al. | 707/609 |
| 7,752,225 B2 * | 7/2010 | Kogan et al. | 707/793 |
| 2002/0052893 A1 * | 5/2002 | Grobler et al. | 707/509 |
| 2002/0072049 A1 | 6/2002 | Prahalad | |
| 2002/0122063 A1 | 9/2002 | Weinberg et al. | |
| 2002/0147725 A1 * | 10/2002 | Janssen et al. | 707/100 |
| 2002/0161784 A1 * | 10/2002 | Tarenskeen | 707/200 |
| 2003/0126152 A1 * | 7/2003 | Rajak | 707/101 |
| 2004/0034669 A1 * | 2/2004 | Smith et al. | 707/201 |
| 2004/0267744 A1 * | 12/2004 | Becker et al. | 707/8 |
| 2005/0055351 A1 * | 3/2005 | Barton et al. | 707/10 |
| 2005/0055382 A1 * | 3/2005 | Ferrat et al. | 707/201 |
| 2005/0193024 A1 * | 9/2005 | Beyer et al. | 707/200 |
| 2005/0198074 A1 * | 9/2005 | Khayter et al. | 707/104.1 |

OTHER PUBLICATIONS

Timur Mirzoev, Synchronous Replication of Remote Storage, 2009, pp. 1-7.*

* cited by examiner

TABLE T IN SOURCE DATABASE

| DIVISION | DEPARTMENT | COUNTRY | Emp_Count | MEASUREMENT |
|---|---|---|---|---|
| 25 | 0001 | USA | 15 | 33.2 |
| 25 | 0002 | USA | 35 | 100.8 |
| 25 | 000A | USA | 7 | 5.7 |
| 32 | 0092 | FRANCE | 22 | 36.8 |
| 32 | 0100 | USA | 48 | 132.0 |
| HG | 0B07 | USA | 16 | 45.2 |

*FIG. 5*

INSTANCE OF TABLE T FROM SOURCE DATABASE

| DIVISION | DEPARTMENT | COUNTRY | Emp_Count | MEASUREMENT |
|---|---|---|---|---|
| 25 | 0001 | USA | 15 | 33.2 |
| 25 | 0002 | USA | 35 | 100.8 |
| 25 | 000A | USA | 7 | 5.7 |

*FIG. 6*

TABULATION OF METADATA FOR TABLE T

| FieldName | DataType | SIZE | DECIMAL |
|---|---|---|---|
| DIVISION | CHAR | 2 | - |
| DEPARTMENT | CHAR | 4 | - |
| COUNTRY | VARCHAR | 30 | - |
| EMP_COUNT | INTEGER | 4 | - |
| MEASUREMENT | DECIMAL | 6 | 1 |

*FIG. 7*

TABLE T IN DESTINATION DATABASE

| DIVISION | DEPARTMENT | COUNTRY | Emp_Count | MEASUREMENT |
|---|---|---|---|---|
| 25 | 0001 | USA | 15 | 33.2 |
| 25 | 0002 | USA | 35 | 100.8 |
| 25 | 000A | USA | 7 | 5.7 |

TRANSFER OF TABLE INSTANCES BETWEEN DATABASES

This application is a continuation application claiming priority to Ser. No. 11/047,191, filed Jan. 31, 2005 now U.S. Pat. No. 7,430,558.

BACKGROUND OF THE INVENTION

1. Technical Field

The present invention relates to a method and system for transferring of one or more instances of a table from a source database to corresponding destination databases.

2. Related Art

Current methods in the related art for transferring an instance of a table from a source database to a destination database are inefficient. Thus, there is a need for a method of transferring an instance of a table from a source database to a destination database, wherein said method is more efficient than currently exists in the related art.

SUMMARY OF THE INVENTION

The present invention provides a method for transferring table instances $X_1, X_2, \ldots, X_N$ of a table T from a source database S to destination databases $D_1, D_2, \ldots, D_N$, respectively, said method being implemented by executing a computer code by a processor of a computer system, said N being at least 1, said method comprising for $I=1, 2, \ldots, N$:

determining whether the table T has been defined for destination database $D_I$, and if said determining determines that the table T has not been defined for the destination database $D_I$ then defining the table T for the destination database $D_I$; and transferring the instance $X_I$ of the N table instances from the source database S into the defined table T of the destination database $D_I$.

The present invention provides a computer system comprising a processor and a computer readable memory unit coupled to the processor, said memory unit containing computer code that when executed by the processor implement a method for transferring table instances $X_1, X_2, \ldots, X_N$ of a table T from a source database S to destination databases $D_1, D_2, \ldots, D_N$, respectively, said N being at least 1, said method comprising for $I=1, 2, \ldots, N$:

determining whether the table T has been defined for destination database $D_I$, and if said determining determines that the table T has not been defined for the destination database $D_I$ then defining the table T for the destination database $D_I$; and transferring the instance $X_I$ of the N table instances from the source database S into the defined table T of the destination database $D_I$.

The present invention provides a computer program product, comprising a computer usable medium having a computer readable program code embodied therein, said computer readable program code comprising an algorithm adapted to implement a method for transferring table instances $X_1, X_2, \ldots, X_N$ of a table T from a source database S to destination databases $D^1, D^2, \ldots, D_N$, respectively, said N being at least 1, said method comprising:

determining whether the table T has been defined for destination database $D_I$, and if said determining determines that the table T has not been defined for the destination database $D_I$ then defining the table T for the destination database $D_I$; and transferring the instance $X_I$ of the N table instances from the source database S into the defined table T of the destination database $D_I$.

The present invention provides a method for deploying computing infrastructure, comprising integrating computer-readable code into a computing system, wherein the code in combination with the computing system is capable of performing a process for transferring table instances $X_1, X_2, \ldots, X_N$ of a table T from a source database S to destination databases $D_1, D_2, \ldots, D_N$, respectively, said process being implemented by executing a computer code by a processor of a computer system, said N being at least 1, said process comprising for $I=1, 2, \ldots, N$:

determining whether the table T has been defined for destination database $D_I$, and if said determining determines that the table T has not been defined for the destination database $D_I$ then defining the table T for the destination database $D_I$; and transferring the instance $X_I$ of the N table instances from the source database S into the defined table T of the destination database $D_I$.

The present invention advantageously provides a method of transferring an instance of a table from a source database to a destination database, wherein said method is more efficient than currently exists in the related art.

DETAILED DESCRIPTION OF THE INVENTION

Figure 1:
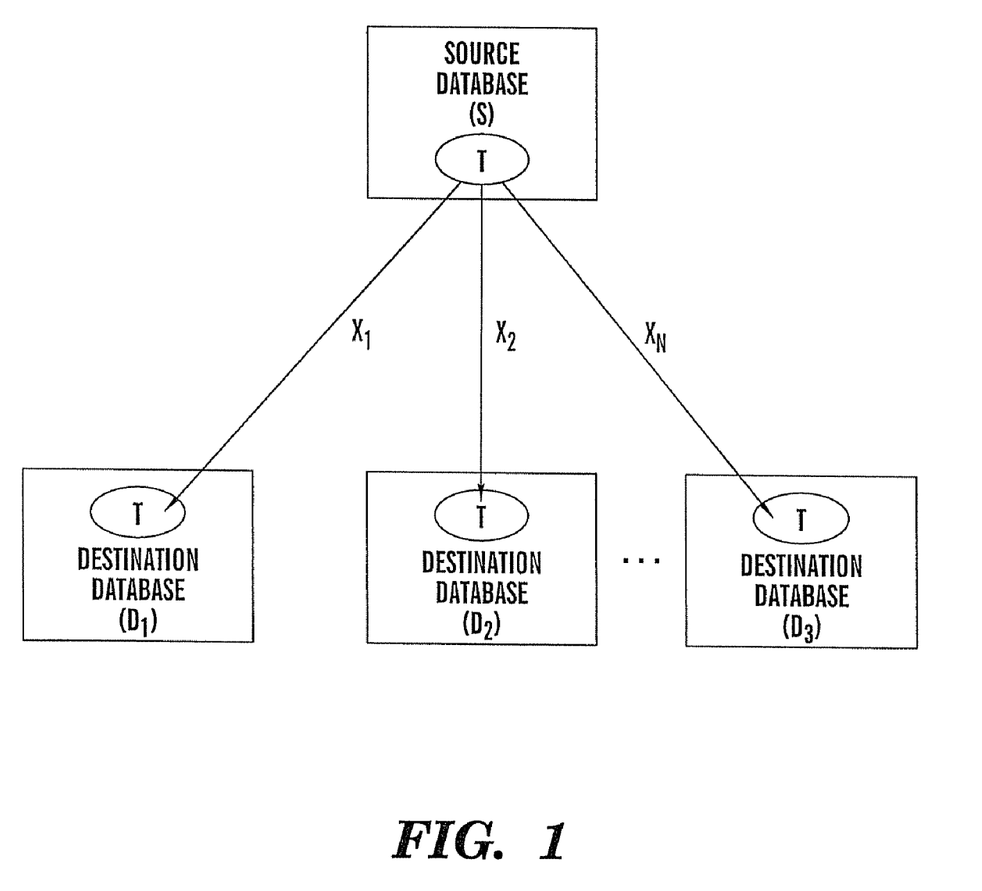
FIG. 1 is a flow chart depicting a database configuration in which table instances are transferred from a source database to destination databases, in accordance with embodiments of the present invention.
Figure 2:
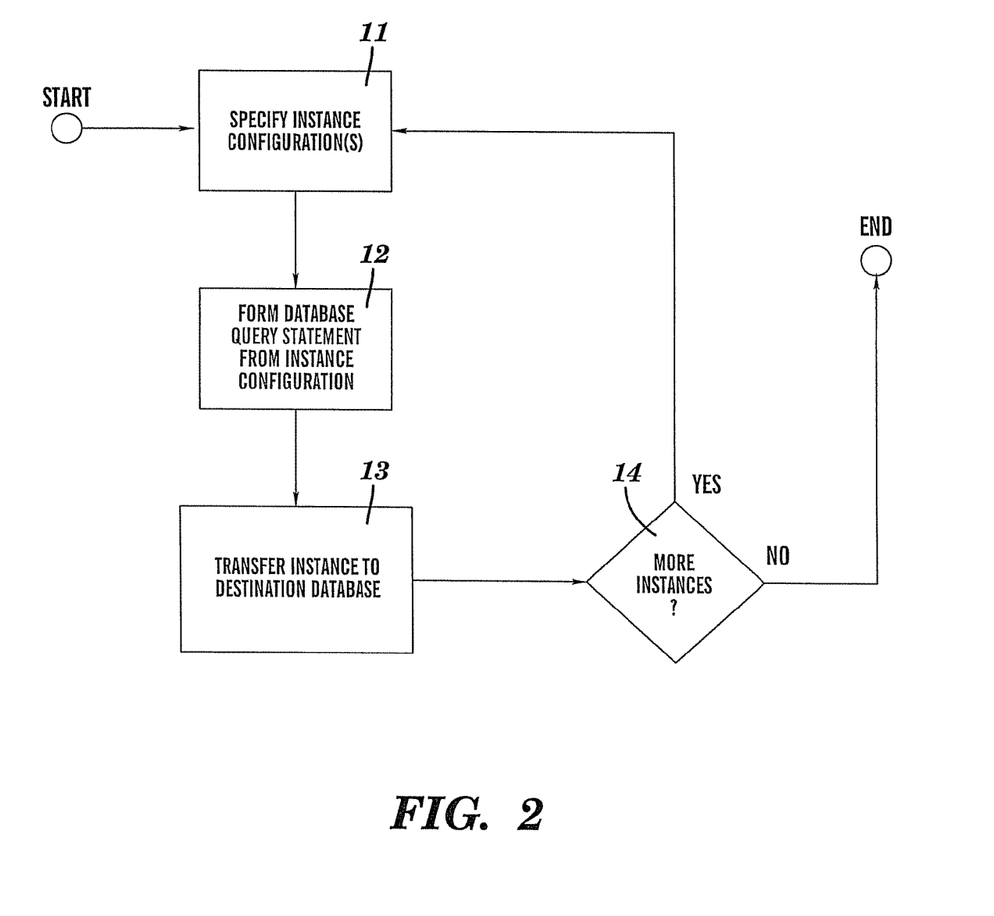
FIGS. 2-4 are flow charts describing transfer of one or more table instances from a source database to corresponding destination databases, in accordance with embodiments of the present invention.
Figure 3:
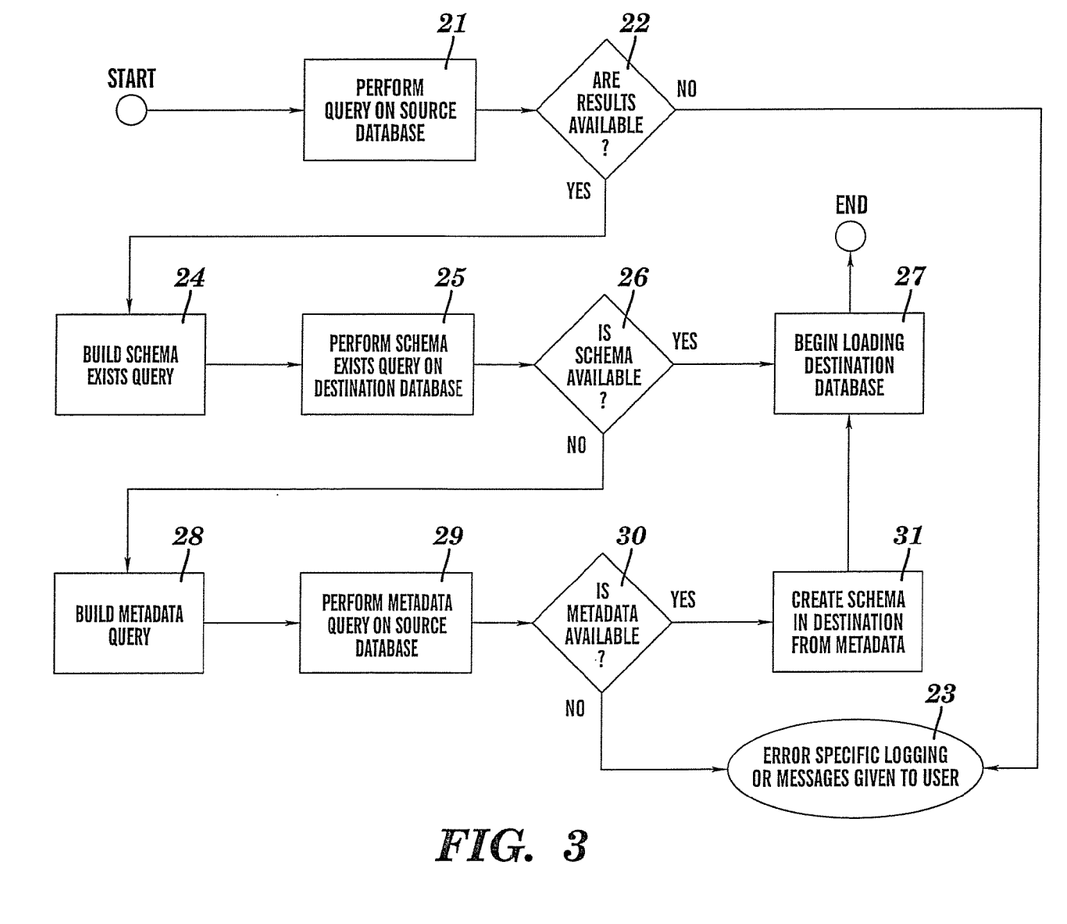
Figure 4:
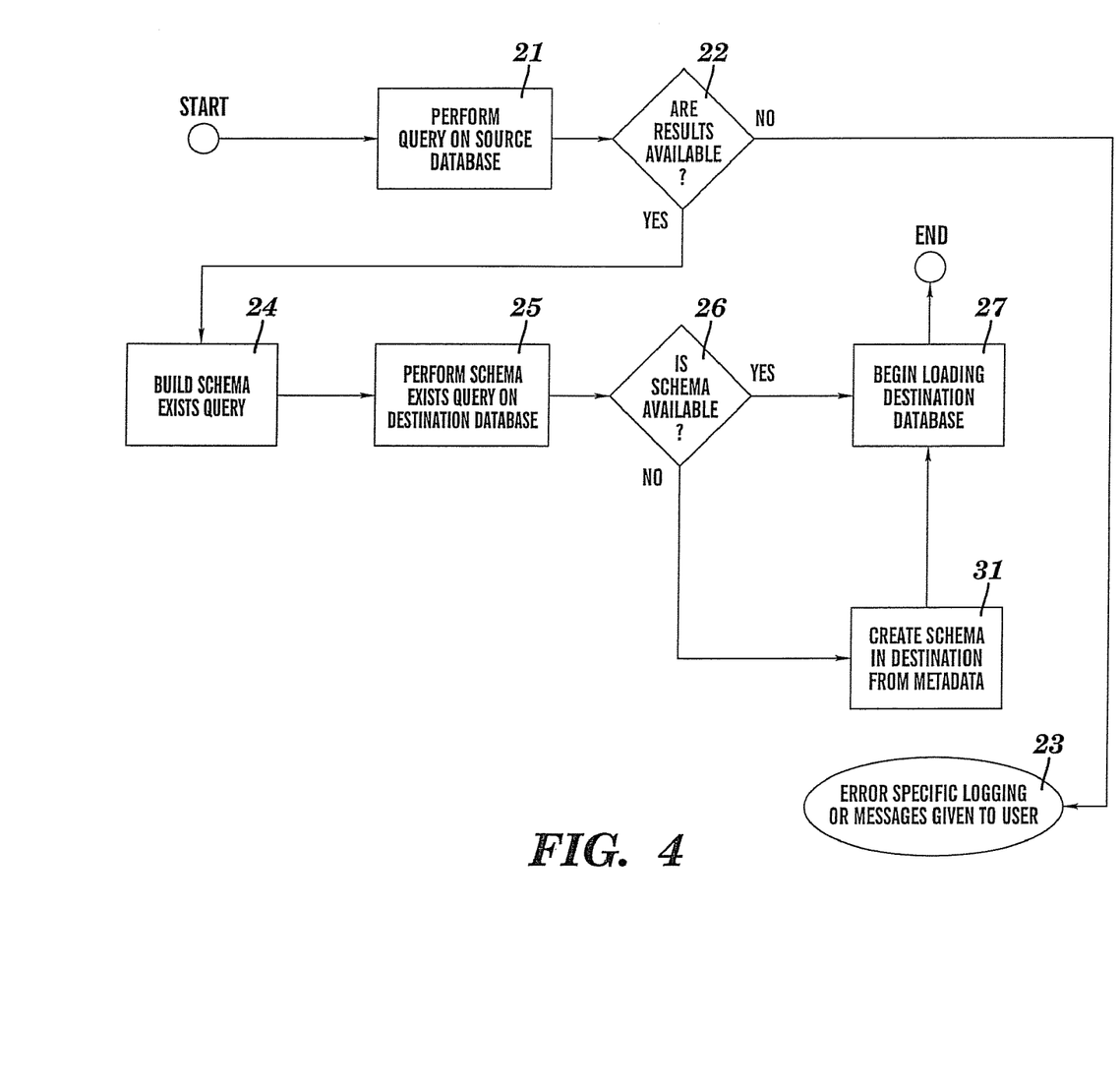

The present invention is directed to transferring N instances of a table T in a source database S to the same table (i.e., having the same name and schema) in N corresponding destination databases on a one-to one basis, as described in the database configuration of FIG. 1, the flow charts of FIGS. 2-4, and in the illustrative example in the tables of FIG. 5-8, in accordance with embodiments of the present invention. The database loading method described by FIGS. 2-4 may be performed by execution of computer code by a processor of a computer system, such as the computer system 90 of FIG. 10 as described infra.

FIG. 1 is a flow chart depicting a database configuration in which table instances $X_1, X_2, \ldots, X_N$ of a table T are respectively transferred from a source database S to destination databases $D_2, \ldots, D_N$, wherein N is at least 1. The source database S and the N destination databases may be located within a same computer system or be distributed among different computer systems in any manner. Data transfer from the source database S to the destination databases $D_1$, $D^2, \ldots, D_N$ is effectuated by a processor, such as by the processor 91 of FIG. 10 as described infra. The source database S may have any communication mode (e.g., internet, intranet, direct connection, etc.) with each of the N destination databases.

Figure 5:
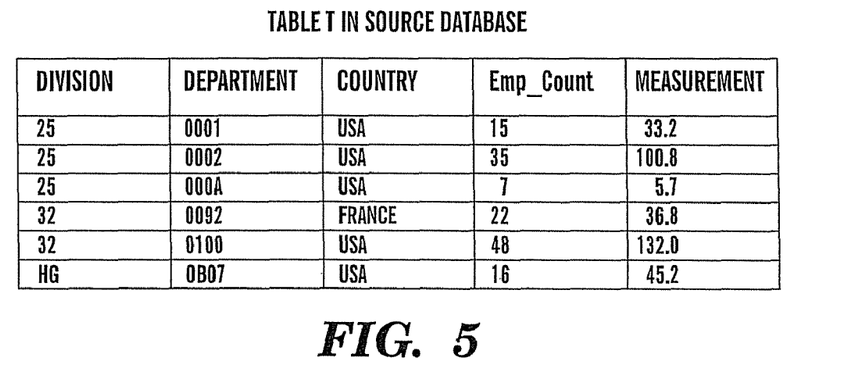
FIGS. 5-8 illustrate tables for an example of transferring a table instance from a source database to a corresponding destination database as described by the flow charts of FIGS. 2-4, in accordance with embodiments of the present invention.
Figure 6:
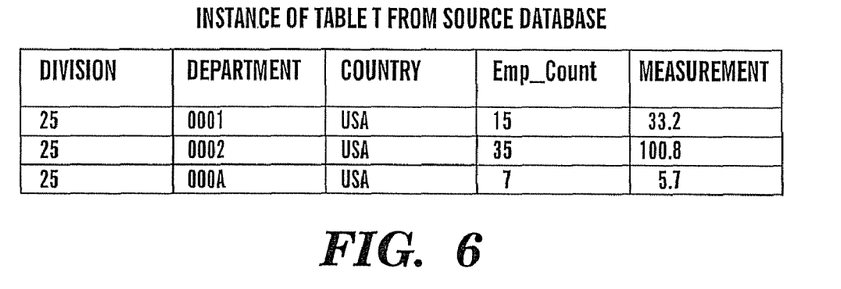
Figure 7:
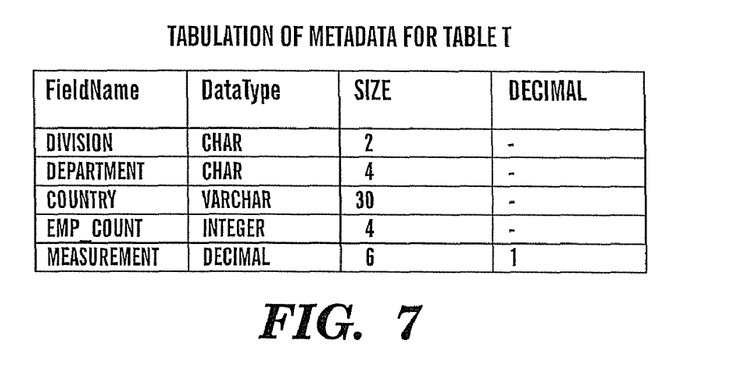

FIG. 5 depicts an illustrative table T in the source database S. Table T has five fields, (also called columns) and six rows. The columns of table T are: Division, Department, Country, Emp_Count, and Measurement.

FIG. 2 is a flow chart comprising steps 11-14 for transferring an instance of the table T from source database S to a destination database. Step 11 specifies one or more instance configurations for determining an instance of the Table T. An "instance" of a table ("table instance") defines a set of rows of the table. An "instance variable" of the table is the name of a field ("field name") of the table. An "instance configuration" of a table is an instance variable of the table in combination with a value of the instance variable. For example with the table T of FIG. 2, an instance configuration may be expressed as "Division=25" in terms of the instance variable "Division" in combination with the value of "25" of Division. Hence, step 11 may specify Division=25 as an instance configuration of the table T in FIG. 2.

Step 12 builds a database query statement from the one or more instance configurations of step 11 for selecting or extracting the table instance of the table T from the source database S. A "database query statement" is any statement framed in a database query language for interacting with a database such as by reading data from the database, writing data into the database, etc. Thus, the database query statement may be, inter alia, a Structured Query Language (SQL) statement, such as: SELECT * FROM T WHERE Division="25" for the instance configuration specified in step 11. The preceding SQL statement will return the table instance $X_1$ shown in FIG. 6.

Figure 8:
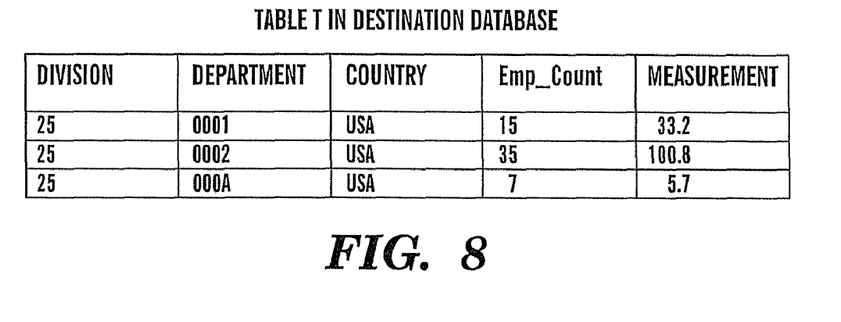

Step 13 transfers the table instance to the same table T in the destination database $D_1$. If the table T in the destination database $D_1$ was empty (i.e., not having any rows) or undefined prior to step 13, then the table T in the destination database $D_1$ is as shown in FIG. 8 after step 13 is performed with respect to the table instance $X_1$ of FIG. 6. FIGS. 3 and 4 are embodiments showing details for implementing step 13 of FIG. 2.

Step 14 determines whether there are any more instances of the table T to be processed. If step 14 determines that there are no more instances of the table T to be processed, then the method of FIG. 2 ends. If step 14 determines that there is at least one more instance of the table T to be processed, then the method loops back to step 11 to repeat steps 11-14 for transferring instance $X_2$ of the table T to the destination database $D_2$. Each pass through steps 11-14 is an iteration of the method, and the method executes N iterations such that the N instances of the table T are respectively transferred to the corresponding N databases.

FIG. 3 is a flow chart comprising steps 21-31 of first embodiments for implementing step 13 of FIG. 2. Step 21 of FIG. 3 performs a query on the source database S using the database query statement formed in step 12 of FIG. 2. As illustrated supra, the database query statement in step 21 may be SELECT * FROM T WHERE Division="25".

Step 22 determines whether the results of step 21 are available (i.e., whether step 21 has returned a result from performance of the database query statement in step 21), which is indicative of whether the table T is defined in the source database S. If the results from step 21 are not available, then the table T may not have been defined in the source database S and the method accordingly stops executing after performing error diagnosis in step 23. If the results from step 21 are available, then step 24 is next executed.

In order to transfer a table instance from the source database S to the destination database, the table schema and associated metadata must exist in the destination database. The table schema define the structural organization of the table and include column names, column widths, and column data types. The data values of schema are called "metadata". Accordingly, step 24 builds (i.e., generates) a database query statement for determining whether the table T exists in the destination database, which is equivalent to determining whether the table schema and associated metadata for table T exist in the destination database. An example of such a database query statement in SQL for the example of FIGS. 5-8 is: IF EXISTS (SELECT * FROM T).

Step 25 performs the query resulting from the database query statement built in step 24. Based on whether any table data is returned from the performance of step 25, step 26 determines whether the table schema and associated metadata for table T exist in the destination database.

If table data is returned from the performance of step 25, then step 26 determines that table schema and associated metadata for table T exist in the destination database and step 27 accordingly loads the destination database with the table instance from table T such as by executing the SQL pseudocode in Table 1 for the example of FIGS. 5-8:

TABLE 1

```
n = SourceResultSet.FirstRow
While Not(n Is NULL)
{
    INSERT INTO DBSCHEMA.TABLE1
    VALUES
    (n.Division,n.Department,n.Country,n.Emp_Count,n.Measurement)
    n = SourceResultSet.NextRow
}
```

If table data is not returned from the performance of step 25, then step 26 determines that table schema and associated metadata for table T does not exist in the destination database and steps 28-31 generate table schema and associated metadata for table T in the destination database.

Step 28 builds a database query statement to obtain the metadata needed to define the table T. Step 29 performs the database query statement performed in step 28. Step 30 determines whether the queried metadata in step 29 has been returned following performance of step 29.

If step 30 determines that the queried metadata in step 29 has not been returned following performance of step 29, then an error diagnosis is performed in step 23. If step 30 determines that the queried metadata in step 29 has been returned (see, e.g., the exemplary returned metadata shown FIG. 6 for the example of FIGS. 5-8) then step 31 is next executed.

Step 31 creates the table schema and associated metadata for table T such by using the returned metadata to build a database query statement that creates the table schema and associated metadata for table T. Table 2 illustrates such a SQL statement using the metadata shown in FIG. 7.

TABLE 2

```
CREATE TABLE T
{
Division char(2)
Department char(4)
Country varchar(30)
Emp_Count integer(4)
Measurement decimal(6,1)
}
```

After step 31 is executed, step 27 is executed to load the destination database with the table instance from table T as described supra.

FIG. 4 is a flow chart comprising steps 21-27 and 31 of second embodiments for implementing step 13 of FIG. 2. The second embodiments of FIG. 4 assume that the database query statement in step 12 of FIG. 2 that returns data (i.e., rows) from the table T when executed also returns the metadata that defines the table T. Lotus Notes® is an example of a software package having database query capabilities that include returning metadata along with real data when the database query statement in step 12 of FIG. 2 is performed.

The flow chart of FIG. 4 differs from the flow chart of FIG. 3 in that steps 28-29 of FIG. 3 are not present in FIG. 4. Thus, if step 26 in FIG. 4 determines that table schema and associated metadata for table T does not exist in the destination database, then step 27 is next performed since the metadata needed for defining the table T is already known from the execution of step 12 of FIG. 2 and it is thus not necessary to determine the metadata as is done in steps 28-29 of FIG. 3. In all other respects, the second embodiments of FIG. 4 are the same as the first embodiments of FIG. 3.

Figure 9:
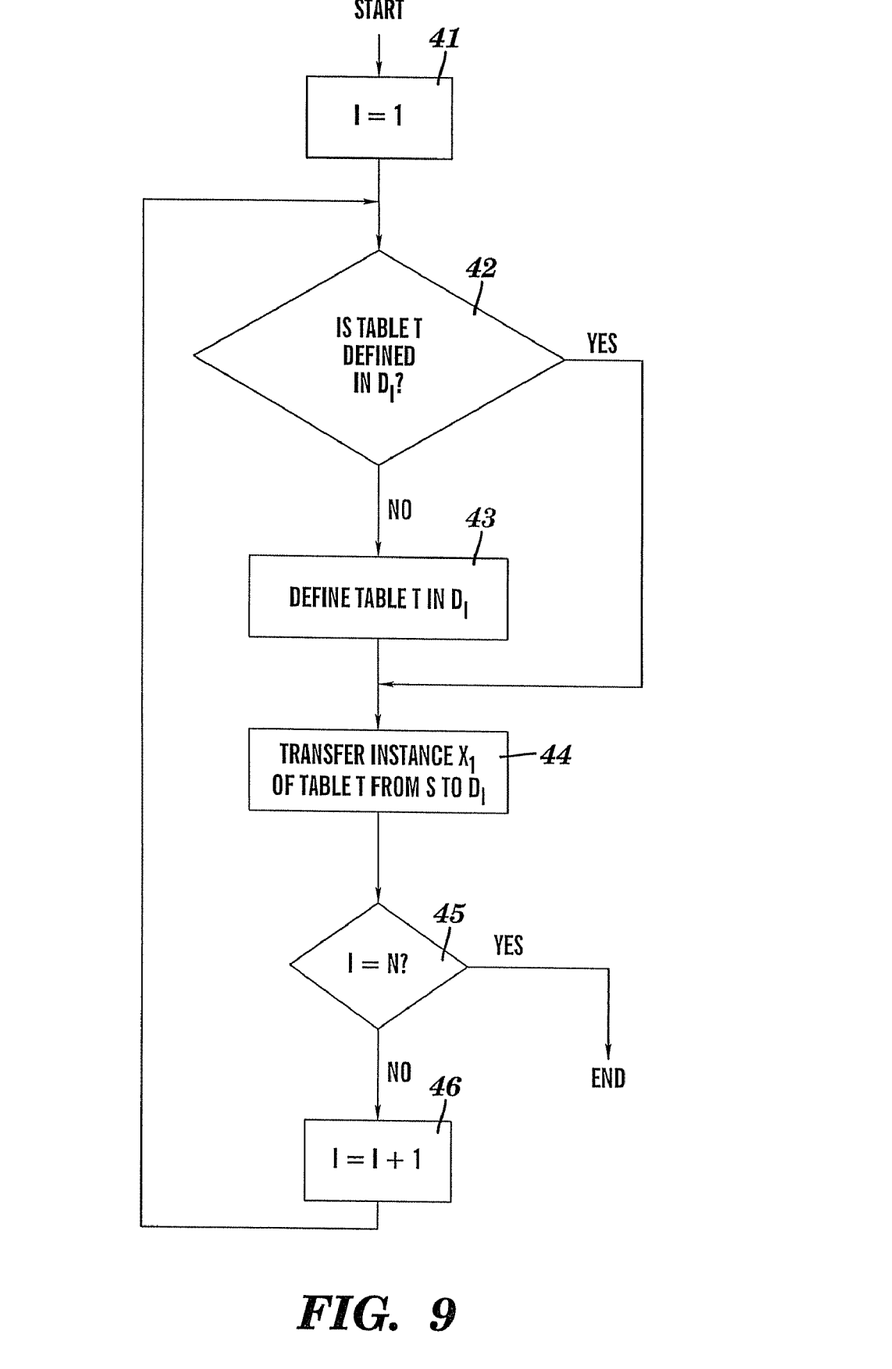
FIG. 9 is a high-level flow chart corresponding to the more detailed flow charts of FIGS. 2-4 for describing transfer of one or more table instances from a source database to corresponding destination databases, in accordance with embodiments of the present invention.

FIG. 9 is a high-level flow chart corresponding to the more detailed flow charts of FIGS. 2-4 for describing transfer of N table instances from a source database S to corresponding destination databases, in accordance with embodiments of the present invention. N is at least 1. Thus N may such values as 1, 2, 3, . . . , etc. The flow chart of FIG. 9 comprises steps 41-46. Some or all of the database query statements used in the implementation of steps 41-46 may be SQL statements.

Step 41 sets a table instance counter 1 to 1 for identifying the table instance $X_I$ of a table T and the corresponding destination database $D_I$ so that the instance $X_I$ may be transferred from a source database S to the destination database $D_I$. By iteratively looping through steps 42-45, the method of FIG. 9 facilitates the transfer of table instances $X_1, X_2, \ldots, X_N$ of the table T from the source database S to the destination databases $D_2, \ldots, D_N$.

Step 42 determines whether the table T is defined in the destination database $D_I$. If step 42 determines that the table T is defined in the destination database $D_I$ then step 44 is next executed.

If step 42 determines that the table T is not defined in the destination database $D_I$ then step 43 is performed to define the table T in the destination database $D_I$, followed by execution of step 44. Defining the table T may comprise providing metadata sufficient for defining the table T; and executing a database table-defining query statement that defines the table T, wherein the database table-defining query statement utilizes the metadata (see, e.g., Table 2 discussed supra). Providing metadata may comprise executing a metadata database query statement on the source database S, wherein executing the metadata database query statement on the source database S includes results in returning the metadata from the source database S.

Given the table T being defined in the destination database $D_I$, step 44 transfers the instance $X_I$ from the source database S into the defined table T of the database $D_I$. The instance transfer of step 44 may comprise: selecting the instance $X_I$ from the source database S; and inserting the selected instance $X_I$ into the defined table T of the database $D_I$. As discussed supra, in one embodiment selecting the instance $X_I$ from the source database S may be implemented by a database query statement that returns both the instance $X_I$ and the metadata.

Note that a single database query statement may be employed to determine whether the table T is defined in the destination database $D_I$ (step 42) and selecting the instance $X_1$ from the source database S (step 44). For the example of FIGS. 5-8, the single database query statement may be: IF EXISTS (SELECT * FROM T WHERE Division="25").

Alternatively for implementation of step 44, the instance $X_I$ from the source database S may be transferred (e.g., pushed or pulled) directly from the source database S to the destination database $D_I$.

Step 45 determines whether I is equal to N. If step 45 determines that I is equal to N then the process ends. If step 45 determines that I is not equal to N then I is incremented by 1 in step 46 and the process loops back to step 42 to execute steps 42-46 for transferring the next table instance to its corresponding database.

Some or all of the table instances to be transferred to the corresponding destination databases may be equal or unequal to each other. For example if N is at least 2 then $X_1$ may be equal to $X_2$, or $X_1$ may be unequal to $X_2$.

Figure 10:
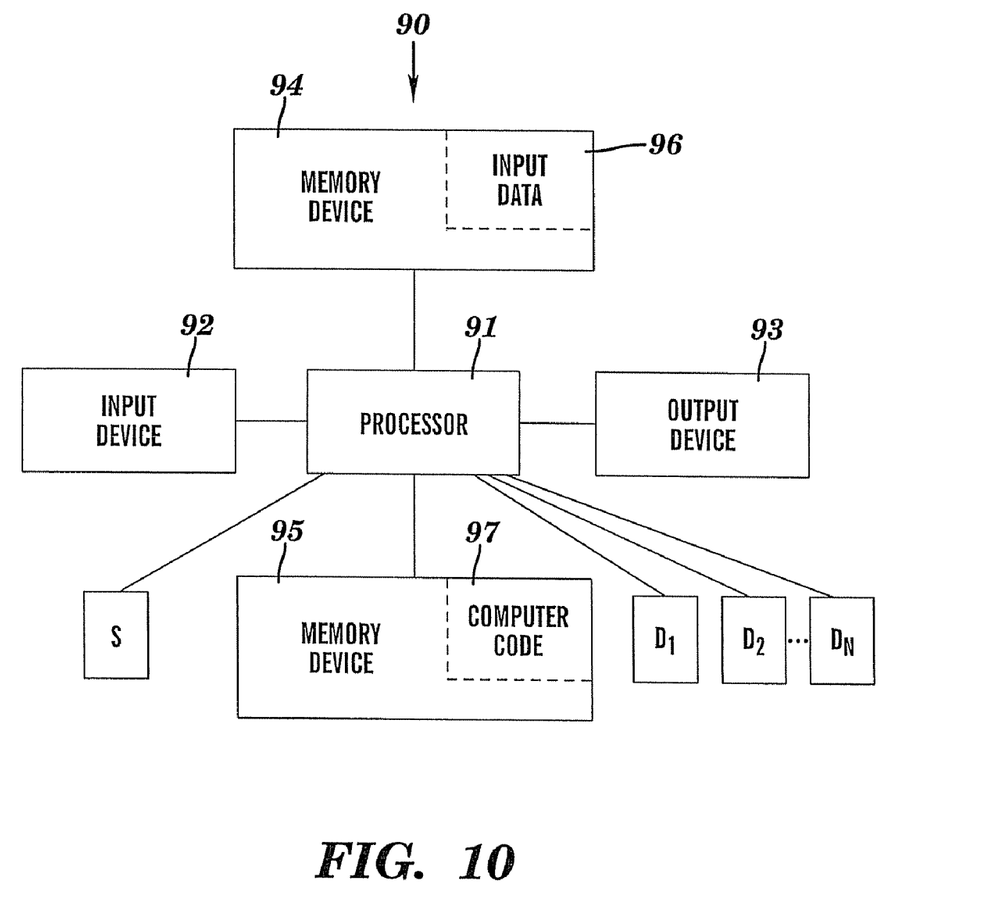
FIG. 10 illustrates a computer system used for transferring of one or more table instances from a source database to corresponding destination databases, in accordance with embodiments of the present invention.

FIG. 10 illustrates a computer system 90 used for transferring of one or more instances of a table from a source database S to corresponding destination databases $D_1, D_2, \ldots, D_N$, in accordance with embodiments of the present invention. The computer system 90 comprises a processor 91, an input device 92 coupled to the processor 91, an output device 93 coupled to the processor 91, memory devices 94 and 95 each coupled to the processor 91, the source database S coupled to the processor 91, and the destination databases $D_1, D_2, \ldots, D_N$ coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for transferring of one or more instances of a table from the source database S to corresponding destination databases $D_1, D_2, \ldots, D_N$. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 10) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for transferring of one or more instances of the table T from the source database S to corresponding destination databases $D_1, D_2, \ldots, D_N$.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising a processor and a computer readable memory unit coupled to the processor, said memory unit containing computer code that when executed by the processor implement a method for transferring table instances $X_1, X_2, \ldots, X_N$ of a table T from a source database S to destination databases $D_1, D_2, \ldots, D_N$, respectively, said N being at least 1, said method comprising for I=1, 2, ..., N:

determining whether the table T has been defined for destination database $D_I$, and if said determining determines that the table T has not been defined for the destination database $D_I$ then defining the table T for the destination database $D_I$; and transferring the instance $X_I$ of the N table instances from the source database S into the defined table T of the destination database $D_I$, wherein the method further comprises prior to said determining whether the table T has been defined for destination database $D_I$ and prior to said transferring the instance $X_I$:

specifying an instance configuration pertaining to the table instance $X_I$, wherein the instance configuration consists of an instance variable of the table T in combination with a value of the instance variable, and wherein the instance variable defines a set of rows of the table T pertaining to the table instance $X_I$;

generating a first database query statement from said instance configuration pertaining to the table instance $X_I$, wherein the first database query statement is configured to return the table instance $X_I$ from the table T in the source database S in response to being performed; and performing a first source database query on the source database S using the generated first database query statement, resulting in returning the table instance $X_I$ from the table T in the source database, wherein said determining whether the table T has been defined for destination database $D_I$ comprises:

generating a destination database query statement from said instance configuration pertaining to the table instance $X_I$, wherein the destination database query statement is configured to return data from the table T in the destination database $D_I$ in response to being performed; and performing a destination database query on the destination database $D_I$ using the generated second database query statement, resulting in returning data from the table T in the destination database $D_I$ if the table T has been defined for destination database $D_I$ or in not returning data from the table T in the destination database $D_I$ if the table T has not been defined for destination database $D_I$, wherein said performing the destination database query on the destination database $D_I$ results in not returning data from the table T in the destination database $D_I$, wherein said defining the table T for the destination database $D_I$ comprises:

creating schema and determining metadata associated with the schema, wherein said schema and associated metadata define the table T in the destination database $D_I$, wherein said determining metadata comprises performing a second database query on the source database S, resulting in returning the metadata from the source database S.

2. The computer system of claim 1, wherein said transferring comprises:

selecting the instance $X_I$ from the source database S; and inserting the selected instance $X_I$ into the defined table T of the destination database $D_I$, wherein said determining and said selecting are implemented by a single database query statement.

3. A computer program product, comprising a computer usable medium having a computer readable program code embodied therein, said computer readable program code comprising an algorithm that when executed by a processor of a computer system implement a method for transferring table instances $X_1, X_2, \ldots, X_N$ of a table T from a source database S to destination databases $D_1, D_2, \ldots, D_N$, respectively, said N being at least 1, said method comprising:

determining whether the table T has been defined for destination database $D_I$, and if said determining determines that the table T has not been defined for the destination database $D_I$ then defining the table T for the destination database $D_I$; and transferring the instance $X_I$ of the N table instances from the source database S into the defined table T of the destination database $D_I$, wherein the method further comprises prior to said determining whether the table T has been defined for destination database $D_I$ and prior to said transferring the instance $X_I$:

specifying an instance configuration pertaining to the table instance $X_I$, wherein the instance configuration consists of an instance variable of the table T in combination with a value of the instance variable, and wherein the instance variable defines a set of rows of the table T pertaining to the table instance $X_I$;

generating a first database query statement from said instance configuration pertaining to the table instance $X_I$, wherein the first database query statement is configured to return the table instance $X_I$ from the table T in the source database S in response to being performed; and performing a first source database query on the source database S using the generated first database query statement, resulting in returning the table instance $X_I$ from the table T in the source database, wherein said determining whether the table T has been defined for destination database $D_I$ comprises:

generating a destination database query statement from said instance configuration pertaining to the table instance $X_I$, wherein the destination database query statement is configured to return data from the table T in the destination database $D_I$ in response to being performed; and performing a destination database query on the destination database $D_I$ using the generated second database query statement, resulting in returning data from the table T in the destination database $D_I$ if the table T has been defined for destination database $D_I$ or in not returning data from the table T in the destination database $D_I$ if the table T has not been defined for destination database $D_I$, wherein said performing the destination database query on the destination database $D_I$ results in not returning data from the table T in the destination database $D_I$, wherein said defining the table T for the destination database $D_I$ comprises:

creating schema and determining metadata associated with the schema, wherein said schema and associated metadata define the table T in the destination database $D_I$, wherein said determining metadata comprises performing a second database query on the source database S, resulting in returning the metadata from the source database S.

4. The computer program product of claim 3, wherein said transferring comprises:

selecting the instance $X_I$ from the source database S; and inserting the selected instance $X_I$ into the defined table T of the destination database $D_I$, wherein said determining and said selecting are implemented by a single database query statement.

\* \* \* \* \*